(12) United States Patent
Urisaka

(10) Patent No.: US 8,040,415 B2
(45) Date of Patent: Oct. 18, 2011

(54) IMAGE SENSING APPARATUS AND CONTROL METHOD

(75) Inventor: Shinya Urisaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 11/854,875

(22) Filed: Sep. 13, 2007

(65) Prior Publication Data
US 2008/0211947 A1  Sep. 4, 2008

(30) Foreign Application Priority Data
Sep. 29, 2006 (JP) ................................ 2006-269014

(51) Int. Cl.
*H04N 5/335* (2011.01)
(52) U.S. Cl. ........................................ 348/296
(58) Field of Classification Search .................. 348/296, 348/274
See application file for complete search history.

(56) References Cited

U.S. PATENT DOCUMENTS

| | | | | |
|---|---|---|---|---|
| 4,746,988 | A * | 5/1988 | Nutting et al. | 348/221.1 |
| 5,539,456 | A * | 7/1996 | Ishii | 348/224.1 |
| 6,441,856 | B1 * | 8/2002 | Sugimoto | 348/371 |
| 6,529,235 | B1 * | 3/2003 | Tseng | 348/223.1 |
| 6,654,062 | B1 * | 11/2003 | Numata et al. | 348/362 |
| 7,002,632 | B2 * | 2/2006 | Takahashi | 348/364 |
| 2001/0028401 | A1 * | 10/2001 | Miyashita et al. | 348/311 |
| 2003/0122939 | A1 * | 7/2003 | Bell et al. | 348/229.1 |
| 2006/0018653 | A1 * | 1/2006 | Kido | 396/310 |
| 2008/0002043 | A1 * | 1/2008 | Inoue et al. | 348/296 |
| 2008/0030604 | A1 * | 2/2008 | Ehara et al. | 348/296 |
| 2008/0151086 | A1 * | 6/2008 | Nakayama | 348/296 |
| 2008/0259175 | A1 * | 10/2008 | Muramatsu et al. | 348/222.1 |

FOREIGN PATENT DOCUMENTS

| | | |
|---|---|---|
| JP | 05-122597 A | 5/1993 |
| JP | 11-164191 A | 6/1999 |
| JP | 2002-199272 | 7/2002 |
| JP | 2003-153073 A | 5/2003 |
| JP | 2004-350204 | 12/2004 |

OTHER PUBLICATIONS

The above foreign patent documents were cited in a Apr. 4, 2011 Japanese Office Action, which is enclosed without an English Translation, that issued in Japanese Patent Application No. 2006-269014.
The above references were cited in a Apr. 27, 2010 European Search Report of the counterpart European Patent Application No. 07117366.0.

* cited by examiner

*Primary Examiner* — Lin Ye
*Assistant Examiner* — Amy Hsu
(74) *Attorney, Agent, or Firm* — Cowan, Liebowitz & Latman, P.C.

(57) ABSTRACT

An image sensing apparatus that controls exposure includes a signal processing unit for processing the output signal of a image sensing element, an aperture control unit for controlling aperture, and an external sensor for measuring the brightness of an object. In this case, exposure is controlled using the luminance information of both the image data and the external sensor, with the sampling period of the external sensor being set to be shorter than the accumulation period of the solid-state image sensing element. At least one of the aperture and the accumulation period is then controlled, based on the luminance information measured by the external sensor during the accumulation period.

5 Claims, 5 Drawing Sheets

IMAGE SENSING APPARATUS AND CONTROL METHOD

BACKGROUND OF THE INVENTION

1. Field of the Invention

The present invention relates to an image sensing apparatus which controls exposure, a control method for the image sensing apparatus, a computer program, and a storage medium.

2. Description of the Related Art

Conventionally, auto exposure (AE) control of an image sensing apparatus having a solid-state image sensing element such as a CCD sensor or a CMOS sensor involves appropriately adjusting the exposure conditions, and setting an exposure period according to the sensitivity of the solid-state image sensing element being used when image sensing is performed. When setting the exposure period, all pixel data for one screen is read and divided into a plurality of image blocks, and a specific image block area is extracted from the plurality of image blocks. The luminance levels of the pixel data in the specific image block area are then integrated to derive an integrated value for all of the pixel data in the specific image block area.

The integrated value is compared with a predetermined luminance level, and the exposure conditions are changed if the comparison result shows a difference. The exposure conditions include the charge accumulation period of the solid-state image sensing element, shutter speed, aperture size, and the like. All the pixel data for one screen is again read from the solid-state image sensing element using the set exposure conditions, and the optimal values of the exposure conditions are derived by measuring, comparing and determining the integrated value for the luminance levels of the pixel data in the specific image block area. By repeating the above operations several times, the conditions at which the integrated value is equal to the prescribed luminance level are determined as the exposure conditions (e.g., see Japanese Patent Laid-Open No. 2004-350204, Japanese Patent Laid-Open No. 2002-199272).

However, with the conventional method of AE control described above, aperture control is performed with each accumulation period because of the use of image data from the solid-state image sensing element, resulting in insufficient exposure control response. The possibility also exists of exposure being destabilized due to changes in brightness during the accumulation period. In particular, exposure is controlled intermittently when image sensing is performed at a slow shutter speed because of the longer accumulation period, making it impossible to obtain stable image data due to not being able to respond to changes in the brightness of the object. Note that a slow shutter speed here indicates a shutter speed of less than 1/60 sec.

SUMMARY OF THE INVENTION

The present invention has been made in consideration of the above situation, and is provided to more swiftly respond to changes in the brightness of an object without a delay of AE control when sensing images at a slow shutter speed with an image sensing apparatus, and to thereby obtain stable image data.

According to one aspect of the present invention, there is provided an image sensing apparatus comprising an image sensing element, an aperture, a shutter unit, an aperture control unit that controls the aperture, a shutter speed control unit that controls the shutter speed, an amplifier that amplifies an output signal of the solid state image sensing element, a signal processing unit that processes the output signal from the image sensing element and outputs image data, and an external sensor that measures, as external luminance information, the brightness of an object for image sensing, for a measurement period that is set to be shorter than a sampling period of the image sensing element, wherein exposure is controlled using the external luminance information measured by the external sensor during a charge accumulation period, if the shutter speed controlled by the shutter speed control unit is set to be longer than a prescribed period.

According to another aspect of the present invention, there is provided a control method for an image sensing apparatus that includes an image sensing element, an aperture, a shutter unit, an amplifier, and an external sensor, comprising the steps of controlling the aperture, controlling the shutter speed, amplifying an output signal of the image sensing element, processing the amplified output signal of the image sensing element and outputting image data, measuring, as external luminance information, the brightness of an object for image sensing using the external sensor during a measurement period that is set to be shorter than a sampling period of the image sensing element and controlling exposure using the external luminance information during a charge accumulation period if the shutter speed controlled in the shutter speed control step is set to be longer than a prescribed period.

Additional features of the present invention will become apparent from the following description of exemplary embodiments, taken in conjunction with the accompanying drawings.

DESCRIPTION OF THE EMBODIMENTS

Preferred embodiments of the present invention will now be described in accordance with the accompanying drawings.

Embodiment 1

Figure 1:
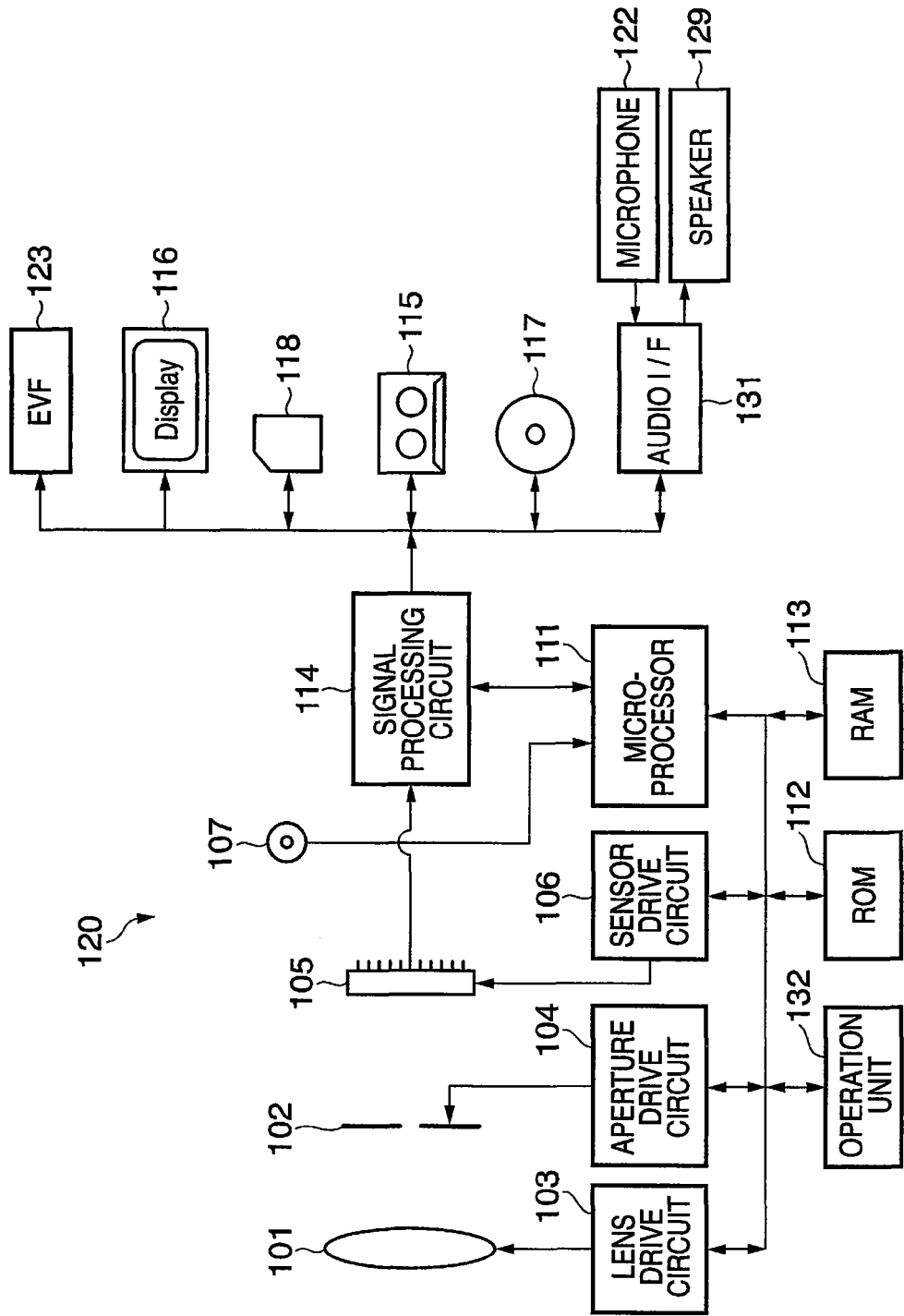
FIG. 1 is a block diagram showing a schematic configuration of an image sensing apparatus according to embodiments of the present invention.
Figure 2:
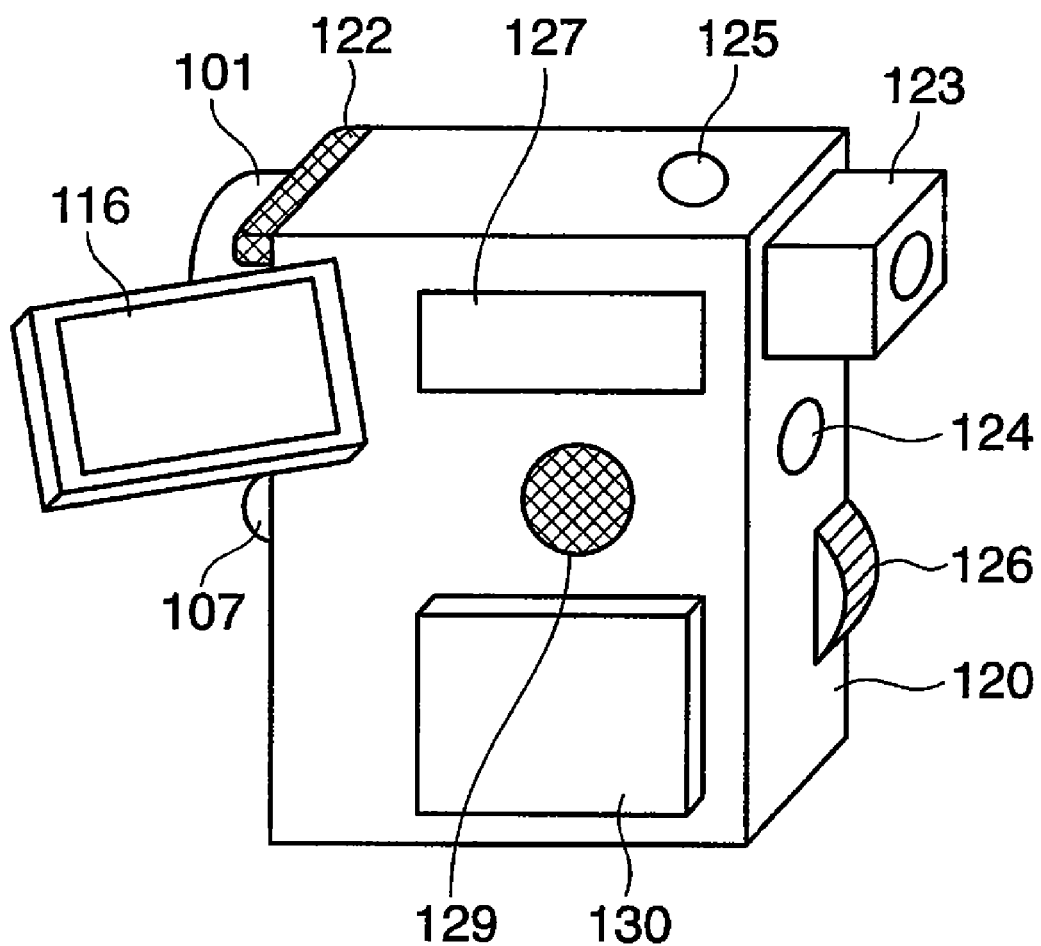
FIG. 2 is a perspective view showing the general appearance of the image sensing apparatus according to embodiments of the present invention.

FIG. 1 is a block diagram showing a schematic configuration of an image sensing apparatus according to the embodiments of the present invention, while FIG. 2 is a perspective view of the external appearance of the image sensing apparatus.

The image sensing apparatus according to the embodiments of the present invention will be described using FIGS. 1 and 2. An image sensing apparatus 120 includes a lens unit 101 and an aperture unit 102 disposed after the lens unit 101, as shown in FIG. 1. The light from the object passing via the lens unit 101 and the aperture unit 102 forms an image of the object on the image sensing surface of a solid-state image sensing element 105. This image is converted from an optical signal to a video signal by the solid-state image sensing element 105. An element having a CCD semiconductor structure or a CMOS semiconductor structure is used for the solid-state image sensing element 105.

The video signal obtained by the solid-state image sensing element 105 is sent to a signal processing circuit 114. The video signal obtained by the solid-state image sensing element 105 is output to a display apparatus 116 constituted by an LCD or the like after having prescribed processing performed thereon by the signal processing circuit 114. If necessary, the video signal is recorded on a magnetic tape 115, a DVD disk 117, a memory card 118 or the like.

Reference numeral 107 denotes an external sensor constituted by a Cds element, a CCD element or the like that is provided on the front of the body of the image sensing apparatus 120, so as to be able to measure the brightness information of the object. The light measured by the external sensor 107 does not pass through the lens unit 101 and aperture unit 102 in the present embodiment. The brightness information measured by the external sensor 107 is sent to a microprocessor 111, and is used to control aperture and shutter speed. The sampling period of the external sensor 107 is independent of the charge accumulation period (sampling period) of the solid-state image sensing element 105. Consequently, the sampling period of the external sensor 107 can be set to be shorter than the charge accumulation period of the solid-state image sensing element 105 or the update period of image data obtained from the solid-state image sensing element 105.

Specifically, when the sampling period of the solid-state image sensing element 105 is set to 1/60 sec, the sampling period of the external sensor 107 is set to several times per 1/60 sec. In the case of a slow shutter speed that is longer than 1/60 sec, the sampling period of the external sensor 107 can be set to once per 1/60 sec, for example, since the sampling period of the external sensor 107 is still shorter than the sampling period of the solid-state image sensing element 105. Processing accuracy increases as the sampling period of the external sensor 107 decreases, although considering processing load, it is better that this sampling period is set below the maximum sampling period of the external sensor 107. Note that in the present specification a slow shutter speed indicates a shutter speed of longer than 1/60 sec.

The microprocessor 111 controls the accumulation and reading of the charge of the solid-state image sensing element 105 via a sensor drive circuit 106 that controls the solid-state image sensing element 105. The microprocessor 111 also controls the focusing and zooming of the lens unit 101 via a lens drive circuit 103. The microprocessor 111 further controls the aperture unit 102 via an aperture drive circuit 104, as well as controlling shutter speed, using the luminance information of the object derived from the image data of the solid-state image sensing element 105 or the luminance information of the object obtained from the external sensor 107, thereby controlling exposure.

A ROM 112 and a RAM 113 are also provided. ROM 112 stores control programs for executing control according to the embodiment of the present invention. Memory areas necessary for the microprocessor 111 to operate, such as various types of primary storage memory area and a work area, are set in the RAM 113. The microprocessor 111 can thereby execute the control programs according to the embodiments of the present invention stored in the ROM 112. Note that the exposure control by the microprocessor 111 will be described in detail below.

The microprocessor 111 uses the signal processing circuit 114 to perform white balance control for sensing the object, with the signal level being processed so that the white balance of the image data will be correct. Further, when necessary, the microprocessor 111 implements a vibration compensation function for when the user performs image sensing, by driving the lens unit 101 via the lens drive circuit 103 or controlling the signal processing circuit 114.

As described above, a storage medium such as a DVD disk, a magnetic tape or a memory card is housed in the image sensing apparatus 120, and moving image data and still image data are recorded to enable playback. Reference numeral 122 denotes a microphone provided for recording audio during image sensing. Reference numeral 129 denotes a speaker provided for outputting audio during playback. The microphone 122 and the speaker 129 are connected to the signal processing circuit 114 via an audio I/F 131.

Reference numeral 123 denotes an electronic viewfinder (EVF) that is provided for confirming the object during image sensing.

An operation unit 132 is provided for the user to perform various operations on the image sensing apparatus 120, with the image sensing apparatus 120 being operated via the microprocessor 111. The operation unit 132 includes the following components described hereinafter. Specifically, reference numeral 124 denotes a moving image trigger switch. The moving image trigger switch 124 is a push button switch operated by the user to convey the start and end of moving image sensing to the device. Reference numeral 125 denotes a still image trigger switch. The still image trigger switch 125 is a push button switch operated by the user to input the start and end of still image sensing.

Reference numeral 126 denotes a rotary mode dial switch. The mode dial 126 enables the user to select, for example, "PLAYBACK" to set playback mode, "CAMERA" to set camera mode, and "OFF" which is neither of these. Reference numeral 127 denotes an operation switch group in which keys are disposed for the user to operate the image sensing apparatus 120, particularly playback and menu operations, for instance. This is an example of the operations realized by operating the operation unit 132.

The display apparatus 116, which is primarily used to check the object during image sensing, similarly to the EVF 123, and display images during playback, is an LCD moveably attached to the side of the body of the image sensing apparatus 120 so as to open and close, as shown in FIG. 2. The display apparatus 116 is configured so as to be rotatable such that it can be rotated about a horizontal axis when it is opened away from the image sensing apparatus 120. Reference numeral 130 denotes a battery that is attachable to the image sensing apparatus 120.

Next, exposure control by the microprocessor 111 in the image sensing apparatus 120 will be described with reference to the flowchart of FIG. 3.

Figure 3:
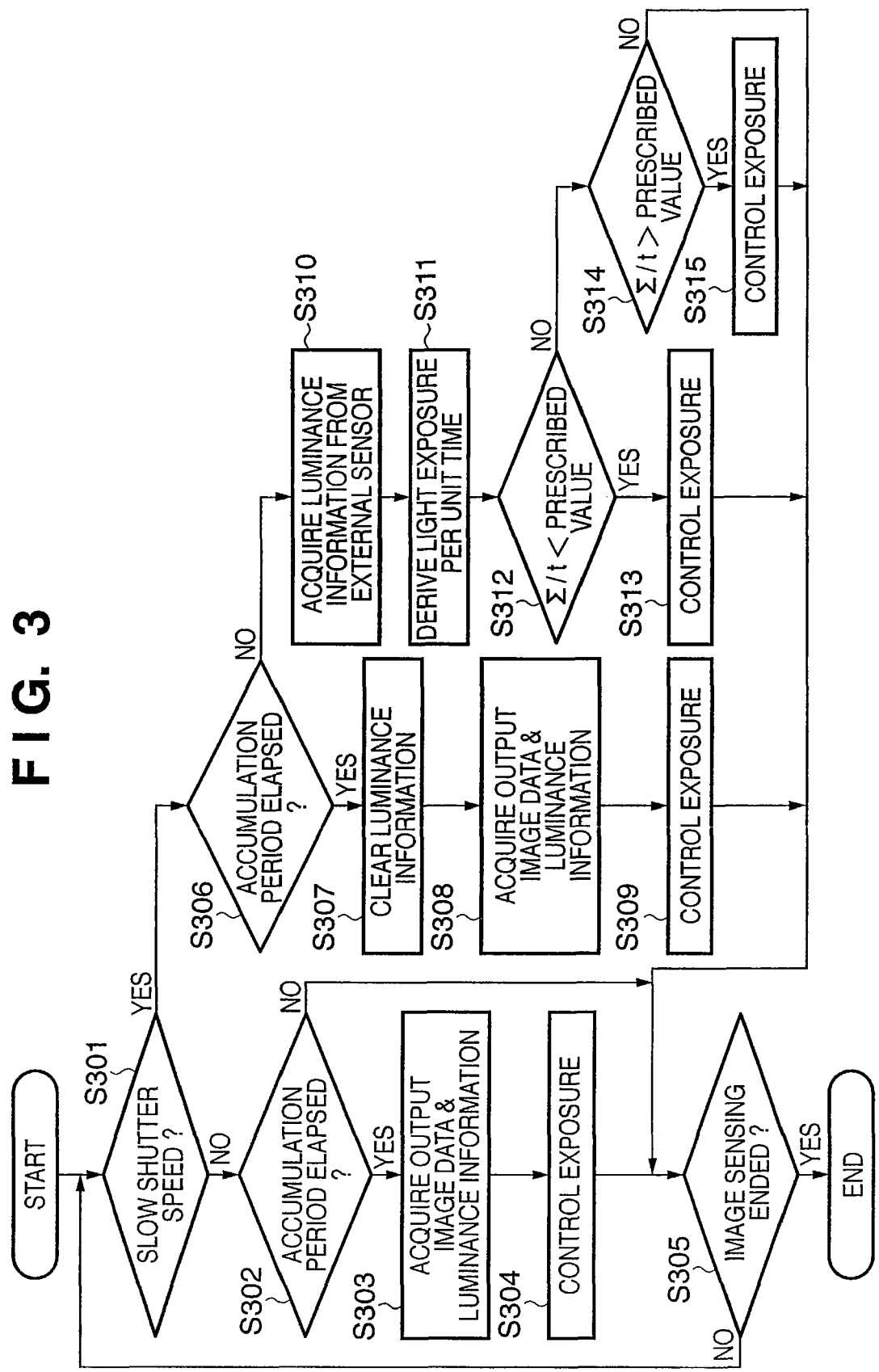
FIG. 3 is a flowchart illustrating an exposure control process executed by the image sensing apparatus according to an embodiment of the present invention.

FIG. 3 is a flowchart showing the exposure control process of the present embodiment. When power is supplied and processing is started, the microprocessor 111, in step S301, determines the shutter speed set for image sensing. If it is determined that the set shutter speed is not a slow shutter speed, the processing proceeds to step S302, where the microprocessor 111 determines whether the elapsed charge accumulation period of the solid-state image sensing element 105 is greater than or equal to a prescribed period. If the elapsed charge accumulation period is shorter than the prescribed period, the processing proceeds to step S305, where the microprocessor 111 determines whether image sensing has ended. Note that, in this case, this prescribed period is determined in accordance with a programmed locus (not shown) showing the relation between object luminance, signal gain, aperture, and shutter speed.

On the other hand, if it is determined in step S302 that the elapsed charge accumulation period is greater than or equal to the prescribed period, the processing proceeds to step S303, where the microprocessor 111 acquires the image data output from the solid-state image sensing element 105 and derives the image luminance information of the object. The processing then proceeds to step S304. In step S304, the microprocessor 111 calculates the optimal aperture and shutter speed based on the image luminance information of the object acquired in step S303. Then, the microprocessor 111 performs control so as to optimize the exposure of the captured image by adjusting the aperture unit 102 and/or the shutter speed as needed. The processing then proceeds to step S305, where the microprocessor 111 determines whether image sensing has ended.

On the other hand, if it is determined in step S301 that the shutter speed is a slow shutter speed, the processing proceeds to step S306, where the microprocessor 111 determines whether the elapsed charge accumulation period of the solid-state image sensing element 105 is greater than or equal to the prescribed period. If it is determined that the elapsed charge accumulation period is greater than or equal to the prescribed period, the processing proceeds to step S307, where the microprocessor 111 clears the held image luminance information. Next, the processing proceeds to step S308, where the microprocessor 111 acquires the image data output from the solid-state image sensing element 105 and derives the image luminance information of the object, similarly to the process for a fast shutter speed.

The processing then proceeds to step S309, where the microprocessor 111 calculates the optimal aperture and shutter speed based on the image luminance information of the object acquired in step S308, and adjusts the aperture unit 102 and/or the shutter speed as needed. The microprocessor 111 thereby performs control so as to optimize the exposure of the sensed image. Next, the processing proceeds to step S305, where the microprocessor 111 determines whether image sensing has ended.

On the other hand, if it is determined in step S306 that the elapsed charge accumulation period is shorter than the prescribed period, the processing proceeds to step S310, where the microprocessor 111 acquires the external luminance information of the object from the external sensor 107. The processing then proceeds to step S311, where the microprocessor 111 calculates the current quantity of light that is incident on the image sensing element 105 from the external luminance information obtained in step S310 and the current camera parameters, and derives the light exposure ($\Sigma$) from the start of charge accumulation. The microprocessor 111 then calculates light exposure per unit time ($\Sigma/t$) in the charge accumulation period. Next, the processing proceeds to step S312, where the microprocessor 111 compares light exposure per unit time thus obtained with a prescribed value. Note that the camera parameters referred to here include aperture and shutter speed. This prescribed value determined in advance is also determined in accordance with the above-mentioned programmed locus.

If it is determined in step S312 that light exposure per unit time is less than the prescribed value, the processing proceeds to step S313, where the microprocessor 111 controls exposure by increasing the aperture or reducing the shutter speed in order to increase light exposure. The values used for controlling exposure in this case are also determined in accordance with the above-mentioned programmed locus.

On the other hand, if it is determined in step S312 that light exposure per unit time is not less than the prescribed value, the processing proceeds to step S314. If, as a result of comparing light exposure per unit time with the prescribed value, it is determined in step S314 that light exposure per unit time is greater than the prescribed value, the processing proceeds to step S315. The microprocessor 111 then controls exposure by decreasing the aperture or increasing the shutter speed in order to reduce light exposure. On the other hand, if it is determined in step S314 that light exposure per unit time is not greater than the prescribed value, or in other words, is equal to the prescribed value, the processing proceeds to step S305. The microprocessor 111 then determines whether image sensing has ended, without changing the aperture or shutter speed.

Here, the prescribed value described above may have a certain range or tolerance, such that changing aperture and/or shutter speed may be performed when light exposure per unit time is not within a prescribed range.

After performing the above processing, the microprocessor 111 in step S305 determines whether image sensing has ended, and repeats the processing from the determination of shutter speed in step S301, until power is cut and control ends. Power is cut when it is determined in step S305 that image sensing has ended, and the microprocessor 111 ends the processing.

As stated above, in the case of a slow shutter speed, exposure can be controlled using a shorter period compared with controlling exposure using only image data. Consequently, it is possible to more promptly respond to changes in the brightness of the object without AE control delay, thereby enabling improved performance in the exposure control of the image sensing apparatus 120.

Embodiment 2

In embodiment 2, the exposure control process performed by the microprocessor 111 in the image sensing apparatus 120 of embodiment 1 is modified as follows. Exposure control by the microprocessor 111 in the image sensing apparatus 120 of embodiment 2 will be described with reference to the flowchart of FIG. 4.

Figure 4:
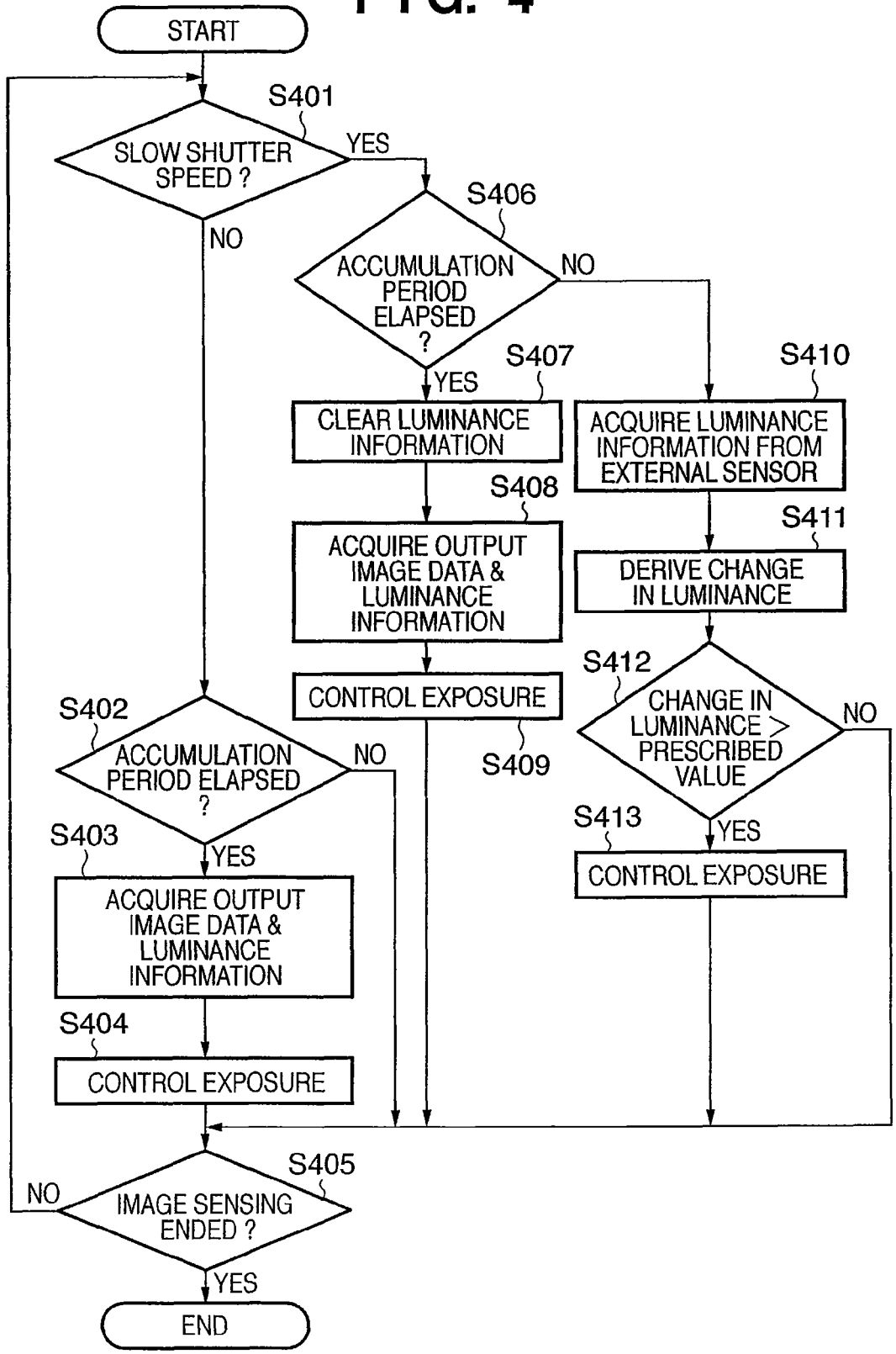
FIG. 4 is a flowchart illustrating an exposure control process executed by the image sensing apparatus according to a further embodiment of the present invention.

FIG. 4 is a flowchart illustrating the exposure control process of embodiment 2. When power is supplied and processing is started, the microprocessor 111, in step S401, firstly determines the shutter speed set for image sensing. If it is determined that the shutter speed is not a slow shutter speed, the processing proceeds to step S402, where the microprocessor 111 determines whether the elapsed charge accumulation period of the solid-state image sensing element 105 is greater than or equal to a prescribed period.

If the elapsed charge accumulation period is shorter than the prescribed period, the processing proceeds to step S405, where the microprocessor 111 determines whether image sensing has ended. On the other hand, if it is determined in step S402 that the elapsed charge accumulation period is greater than or equal to the prescribed period, the processing proceeds to step S403, where the microprocessor 111 acquires the image data output from the solid-state image sensing element 105 and derives the image luminance information of the object.

Next, in step S404, the microprocessor 111 calculates the optimal aperture and shutter speed based on the image luminance information of the object acquired in step S403. Then, the microprocessor 111 performs control so as to optimize the exposure of the captured image by adjusting the aperture unit 102 and/or the shutter speed as needed. The processing then proceeds to step S405, where the microprocessor 111 determines whether image sensing has ended.

On the other hand, if it is determined in step S401 that the shutter speed is a slow shutter speed, the processing proceeds to step S406, where the microprocessor 111 determines whether the elapsed charge accumulation period of the solid-state image sensing element 105 is greater than or equal to the prescribed period. If it is determined that the elapsed charge accumulation period is greater than or equal to the prescribed period, the processing proceeds to step S407, where the microprocessor 111 clears the held image luminance information. Next, the processing proceeds to step S408, where the microprocessor 111 acquires the image data output from the solid-state image sensing element 105 and derives the image luminance information of the object, similarly to when not a slow shutter speed.

The processing then proceeds to step S409, where the microprocessor 111 calculates the optimal aperture and shutter speed based on the image luminance information of the object acquired in step S408. Then, the microprocessor 111 performs control so as to optimize the exposure of the captured image by adjusting the aperture unit 102 and/or the shutter speed as needed. The microprocessor 111 then determines in step S405 whether image sensing has ended.

On the other hand, if it is determined in step S406 that the elapsed charge accumulation period is shorter than the prescribed period, the processing proceeds to step S410, where the microprocessor 111 acquires the external luminance information of the object from the external sensor 107. Then in step S411, the microprocessor 111 derives the change in the external luminance of the object based on the latest external luminance information obtained in step S410 and the external luminance information previously obtained. The processing then proceeds to step S412, where the microprocessor 111 compares the derived change in external luminance with a prescribed value.

If, in step S412, the change in external luminance is greater than the prescribed value, it is judged that the brightness of the object has changed significantly, and the processing proceeds to step S413. If it is thus judged that the brightness of the object has changed significantly, the microprocessor 111 controls exposure by controlling the aperture and/or the shutter speed based on the latest external luminance information in order to adjust light exposure.

On the other hand, if it is determined in step S412 that the change in external luminance is not greater than the prescribed value, the microprocessor 111 in step S405 determines whether image sensing has ended, without changing the aperture or shutter speed.

After performing the above processing, the microprocessor 111 in step S405 determines whether image sensing has ended, and repeats the processing from the determination of shutter speed in step S401, until power is cut and control ends. When power is cut, the microprocessor 111 ends the processing.

As stated above, if the change in the external luminance information of the external sensor during the accumulation period is greater than a prescribed value determined in advance, the microprocessor 111 controls exposure during the charge accumulation period by adjusting the aperture and/or the charge accumulation period. Accordingly, it is possible to reliably respond to significant changes in the brightness of the object without controlling exposure unnecessarily as a result of small changes in the luminance of the object, thereby enabling improved performance in the exposure control of the image sensing apparatus.

Embodiment 3

In embodiment 3, the exposure control process performed by the microprocessor 111 in the image sensing apparatus 120 of embodiment 1 is modified as follows.

Exposure control by the microprocessor 111 in the image sensing apparatus 120 of embodiment 3 will be described with reference to the flowchart of FIG. 5.

Figure 5:
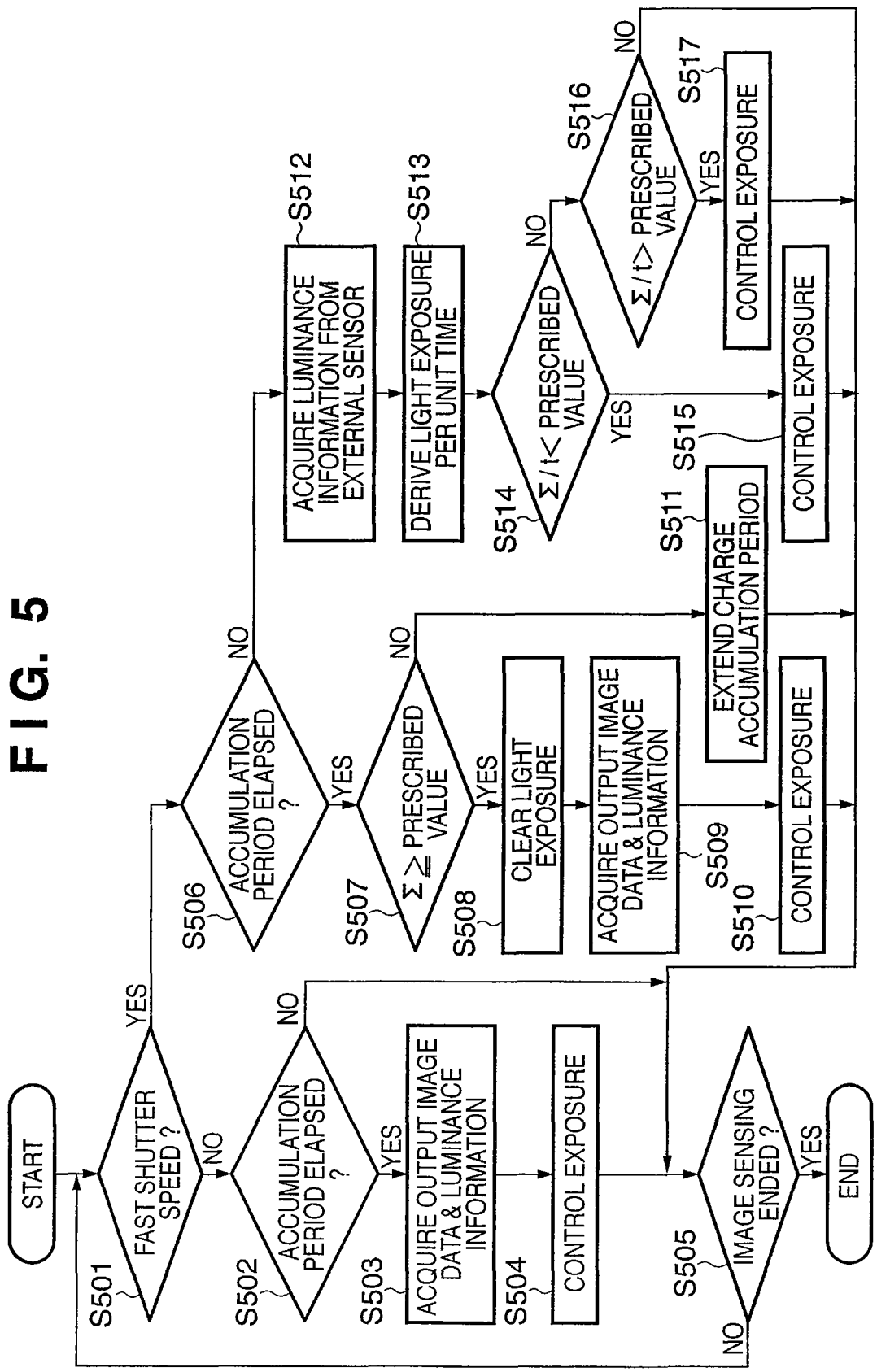
FIG. 5 is a flowchart illustrating an exposure control process executed by the image sensing apparatus according to another embodiment of the present invention.

FIG. 5 is a flowchart illustrating the exposure control process of embodiment 3. When power is supplied and processing is started, the microprocessor 111, in step S501, firstly determines the shutter speed set for image sensing. If it is determined that the shutter speed is not a fast shutter speed, the processing proceeds to step S502, where the microprocessor 111 determines whether the elapsed charge accumulation period of the solid-state image sensing element 105 is greater than or equal to a prescribed period. If the elapsed charge accumulation period is shorter than the prescribed period, the processing proceeds to step S505, where the microprocessor 111 determines whether image sensing has ended.

On the other hand, if it is determined in step S502 that the elapsed charge accumulation period is greater than or equal to the prescribed period, the processing proceeds to step S503, where the microprocessor 111 acquires the image data output from the solid-state image sensing element 105 and derives the image luminance information of the object.

Next, in step S504, the microprocessor 111 calculates the optimal aperture and shutter speed based on the image luminance information of the object acquired in step S503. Then, the microprocessor 111 performs control so as to optimize the exposure of the captured image by adjusting the aperture unit 102 and/or the shutter speed as needed. The processing then proceeds to step S505, where the microprocessor 111 determines whether image sensing has ended.

Here, in the case where it is determined in step S501 that the shutter speed is not a fast shutter speed, the microprocessor 111 may further judge whether the shutter speed is a slow shutter speed, and control exposure as shown in embodiment 1 or embodiment 2.

On the other hand, if it is determined in step S501 that the shutter speed is a fast shutter speed, the processing proceeds to step S506, where the microprocessor 111 determines whether the elapsed charge accumulation period of the solid-state image sensing element 105 is greater than or equal to the prescribed period. If it is determined that the elapsed charge accumulation period is greater than or equal to the prescribed period, the processing proceeds to step S507, where the microprocessor 111 compares the held light exposure ($\Sigma$), comprising the image luminance information, with a prescribed value determined in advance. In this case, if the light exposure is greater than or equal to the prescribed value, the processing proceeds to step S508, where the microprocessor 111 determined that light exposure is correct and clears the held value of light exposure.

Next, the processing proceeds to step S509, where the microprocessor 111 acquires the image data output from the solid-state image sensing element 105 and derives the image luminance information of the object, similarly to the process when the shutter speed is slow. Then, in step S510, the microprocessor 111 calculates the optimal aperture and shutter speed based on the image luminance information of the object acquired in step S509. Then, the microprocessor 111 performs control so as to optimize the exposure of the sensed image by adjusting the aperture unit 102 and/or the shutter speed as needed. The microprocessor 111 then determines in step S505 whether image sensing has ended.

On the other hand, if it is determined in step S507 that the light exposure is less than the prescribed value, the processing proceeds to step S511, where the microprocessor 111 extends the charge accumulation period to compensate for the insufficient light exposure, before proceeding to step S505 and determining whether image sensing has ended.

On the other hand, if it is determined in step S506 that the elapsed accumulation period is shorter than the prescribed period, the processing proceeds to step S512, where the microprocessor 111 acquires the external luminance information of the object from the external sensor 107. The processing then proceeds to step S513, where the microprocessor 111 calculates the current quantity of light that is incident on the image sensing element 105 based on the external luminance information obtained in step S512 and the current camera parameters, and derives the light exposure ($\Sigma$) from the start of charge accumulation. The microprocessor 111 further calculates light exposure per unit time ($\Sigma/t$) in the current charge accumulation period. The processing then proceeds to step S514, where the microprocessor 111 compares the obtained light exposure per unit time with a prescribed value determined in advance. Note that the camera parameters referred to here include aperture and shutter speed.

If it is determined that light exposure per unit time is less than the prescribed value, the processing proceeds to step S515, where the microprocessor 111 controls exposure by increasing the aperture or reducing the shutter speed in order to increase light exposure. Conversely, if it is determined that light exposure per unit time is not less than the prescribed value as a result of the comparisons in steps S514 and S516, the microprocessor 111 in step S517 controls exposure by decreasing the aperture or increasing the shutter speed in order to reduce light exposure.

If light exposure per unit time is equal to the prescribed value, the microprocessor 111 in step S505 determines whether image sensing has ended, without changing the aperture or shutter speed. Here, the prescribed value may have a certain range or tolerance, or in other words, the control for changing aperture and/or shutter speed may be performed when light exposure per unit time is not within a prescribed range.

After performing the above processing, the microprocessor 111 in step S505 determines whether image sensing has ended, and repeats the processing from the determination of shutter speed in step S501, until power is cut and control ends. When power is cut, the microprocessor 111 ends the processing.

As stated above, light exposure is calculated for each charge accumulation period based on the external luminance information from the external sensor 107, and the charge accumulation period is extended if the calculated light exposure does not reach a prescribed level. Changes in the brightness of the object can be tracked even in a situation that would conventionally have resulted in insufficient light exposure due to changes in the brightness of the object in the case of a fast shutter speed, thereby enabling improved performance in the exposure control of the image sensing apparatus.

Also, in the present invention, exposure is controlled by controlling aperture and shutter speed, although exposure may be controlled by controlling gain using a programmable gain amplifier (PGA, not shown), or by controlling gain using the PGA, aperture and shutter speed.

Note that the present invention can be achieved by directly or indirectly supplying a software program that implements the functions of the foregoing embodiments to a system or apparatus, and using a computer in the system or apparatus to read and execute the supplied program code.

Consequently, since the functions of the present invention are implemented by a computer, the actual program code installed on the computer also implements the present invention. In other words, the claims of the present invention also cover the actual computer program for implementing the functions of the present invention. In this case, provided the system or apparatus has the functions of the program, the program may be executed in any form, such as an object code, a program executed by an interpreter, or script data supplied to an operating system.

Examples of storage media that can be used for supplying the program include floppy disk, hard disk, optical disk, magneto-optical disk, CD-ROM, CD-R, CD-RW, magnetic tape, nonvolatile memory card, ROM, and DVD (DVD-ROM, DVD-R).

Alternatively, the program can also be supplied by connecting to a website on the Internet using the browser of a client computer, and downloading the program from the website to a recording medium such as a hard disk. In this case, the actual program of the present invention or a compressed file including an auto-install function may be downloaded. Further, the program of the present invention can be supplied by dividing the program code constituting the program into a plurality of files and downloading the respective files from different websites. In other words, a World Wide Web (WWW) server that allows a plurality of users to download program files for implementing the functions of the present invention with a computer is also covered by the claims of the present invention.

The program of the present invention may also be distributed to users in encrypted form stored on a storage medium such as a CD-ROM. In this case, users that meet prescribed requirements are allowed to download decryption key information from a website via the Internet, and the program decrypted using this key information is installed on a computer in an executable format.

The functions of the embodiments can be implemented in forms other than those described above, as a result of a computer executing the read program. For example, an operating system or the like running on a computer can perform part or all of the actual processing based on instructions in the program, with the functions of the foregoing embodiments being implemented as a result of this processing.

Further, the program read from the storage medium may also be written to a memory provided in a function expansion board inserted in a computer or a function expansion unit connected to a computer. In this case, a CPU or the like provided in the function expansion board or the function expansion unit then performs part or all of the actual processing based on instructions in the program, with the functions of the above embodiments being implemented as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-269014, filed on Sep. 29, 2006, which is hereby incorporated by reference herein in its entirety.

What is claimed is:

1. An image sensing apparatus comprising:
    an image sensing unit configured to sense an object and periodically acquire image data;
    a first photometry unit configured to obtain luminance information of the object on the basis of the image data acquired by the image sensing unit;
    a second photometry unit configured to obtain luminance information of the object at a period shorter than a period at which the image data is acquired by the image sensing unit;
    a setting unit configured to set a shutter speed of the image sensing unit; and
    an exposure control unit configured to perform exposure control using the luminance information obtained by the second photometry unit in a case where the shutter speed set by the setting unit is slower than a predetermined shutter speed, and using the luminance information obtained by the first photometry unit in a case where the shutter speed set by the setting unit is not slower than the predetermined shutter speed.

2. The image sensing apparatus according to claim 1, wherein, in a case where the shutter speed set by the setting unit is slower than the predetermined shutter speed, the exposure control unit performs the exposure control using the luminance information obtained by the second photometry unit if a time period elapsed since start of charge accumulation in the image sensing unit is shorter than a predetermined time period, and performs the exposure control using the luminance information obtained by the first photometry unit if the elapsed time period is not shorter than the predetermined time period.

3. The image sensing apparatus according to claim 1, wherein, in a case where the shutter speed set by the setting unit is slower than the predetermined shutter speed and a time period elapsed since start of charge accumulation in the image sensing unit is shorter than a predetermined time period, the exposure control unit performs the exposure control using the luminance information obtained by the second photometry unit if an amount of change in luminance between a latest luminance information and a second latest luminance information obtained by the second photometry unit is greater than a predetermined value.

4. The image sensing apparatus according to claim 1, wherein the second photometry unit is an external sensor provided on a front surface of the image sensing apparatus.

5. A control method of an image sensing apparatus having an image sensing unit configured to sense an object and periodically acquire image data; a first photometry unit configured to obtain luminance information of the object on the basis of the image data acquired by the image sensing unit; and a second photometry unit configured to obtain luminance information of the object at a period shorter than a period at which the image data is acquired by the image sensing unit, said method comprising:
    a setting step of setting a shutter speed of the image sensing unit; and
    an exposure control step of performing exposure control using the luminance information obtained by the second photometry unit in a case where the shutter speed set in the setting step is slower than a predetermined shutter speed, and using the luminance information obtained by the first photometry unit in a case where the shutter speed set in the setting step is not slower than a predetermined shutter speed.

* * * * *